Figure 1:
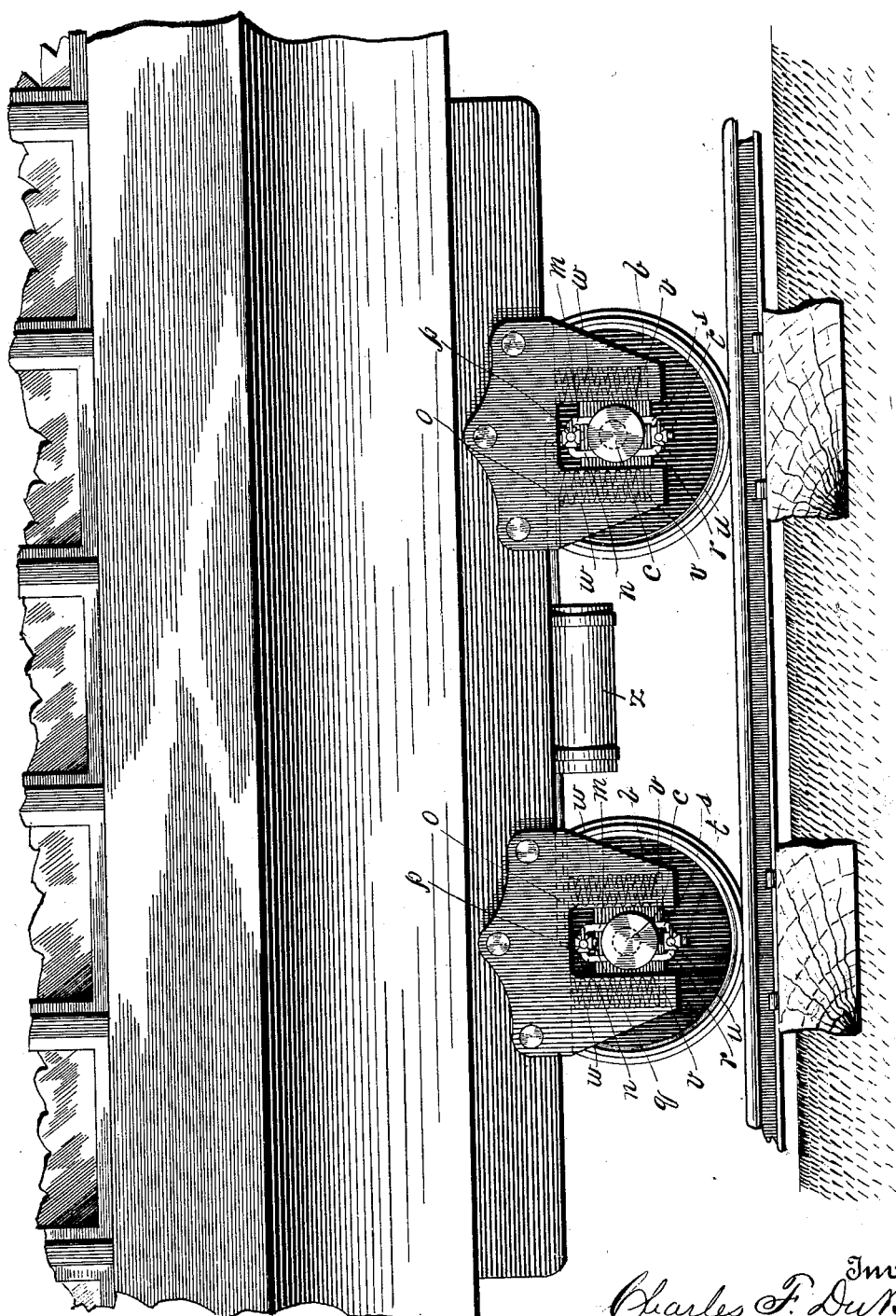

No. 704,475. Patented July 8, 1902.
C. F. DU BOIS.
COMBINED JOURNAL BEARING AND AIR COMPRESSOR.
(Application filed June 1, 1900.)
(No Model.) 3 Sheets—Sheet 1.

No. 704,475. Patented July 8, 1902.
C. F. DU BOIS.
COMBINED JOURNAL BEARING AND AIR COMPRESSOR.
(Application filed June 1, 1900.)

(No Model.) 3 Sheets—Sheet 2.

Witnesses
C. W. Hart.
James R. Mansfield.

Inventor
Charles F. Du Bois.
By
Alexander & Dowell
Attorneys

No. 704,475. Patented July 8, 1902.
C. F. DU BOIS.
COMBINED JOURNAL BEARING AND AIR COMPRESSOR.
(Application filed June 1, 1900.)
(No Model.) 3 Sheets—Sheet 3.
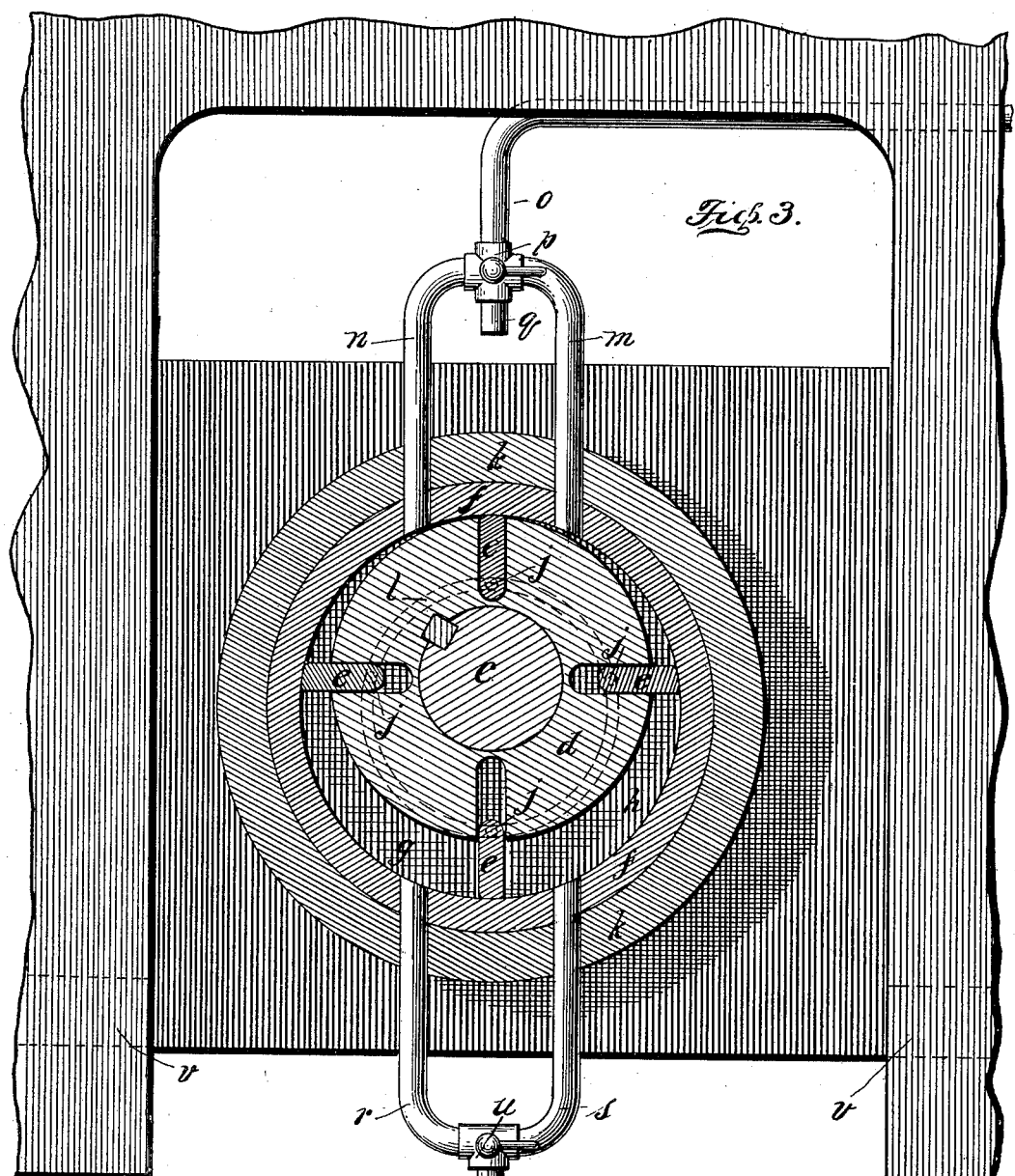
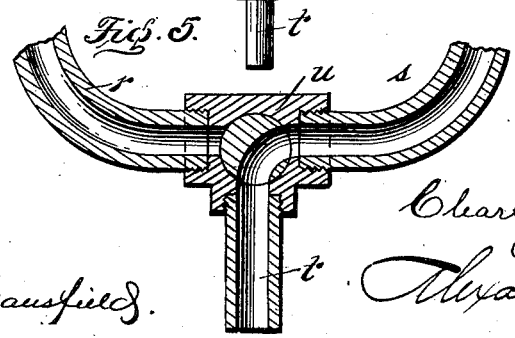

UNITED STATES PATENT OFFICE.

CHARLES F. DU BOIS, OF DENVER, COLORADO.

COMBINED JOURNAL-BEARING AND AIR-COMPRESSOR.

SPECIFICATION forming part of Letters Patent No. 704,475, dated July 8, 1902.

Application filed June 1, 1900. Serial No. 18,739. (No model.)

*To all whom it may concern:*

Be it known that I, CHARLES F. DU BOIS, of Denver, in the county of Arapahoe and State of Colorado, have invented certain new and useful Improvements in a Combined Journal-Bearing and Air-Compressor; and I hereby declare that the following is a full, clear, and exact description thereof, reference being had to the accompanying drawings, which form part of this specification.

This invention is an improvement in air-compressors for vehicles and stationary machinery; and its object is to produce a combined journal-bearing and air-compressor especially adapted for street-cars and other vehicles wherein the compressed air can be utilized for propelling the vehicle, for braking purposes, or for other uses; and a further object of the invention is to so construct and arrange the compressors that the limit of compression of the air will be regulated by the weight of the vehicle.

The essential features of the invention are summarized in the claim following the description of the form of apparatus shown in the drawings, wherein the invention is illustrated as applied to a street-car.

Figure 2:
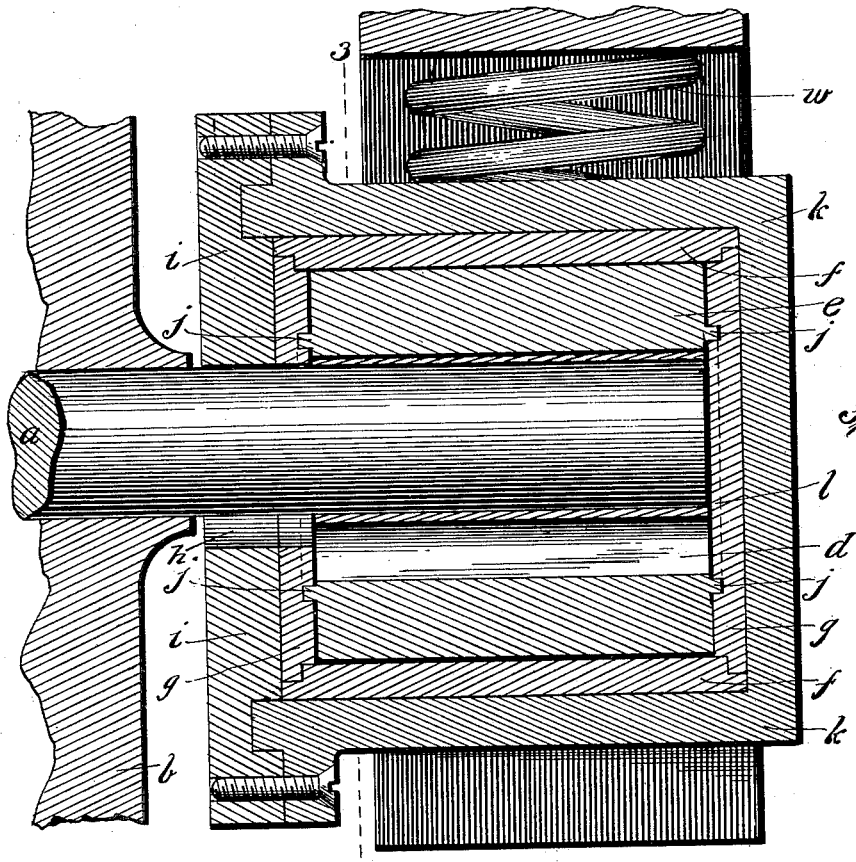
Figure 4:
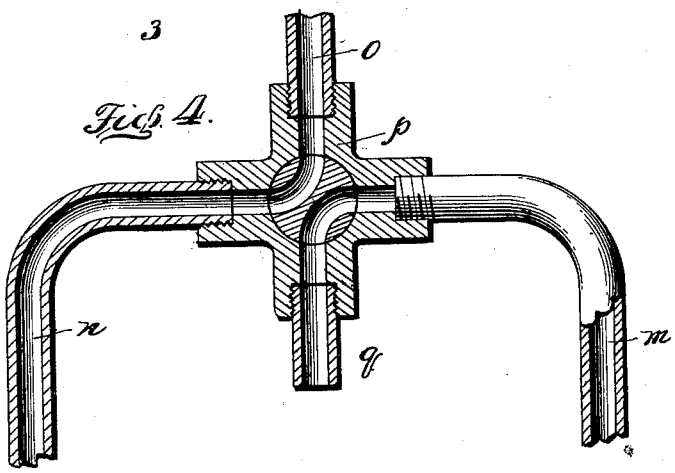

In said drawings, Figure 1 is a side elevation of part of a car with my invention applied. Fig. 2 is an enlarged longitudinal section through one of the combined journal-compressors. Fig. 3 is a transverse section on line 3 3, Fig. 2. Fig. 4 is a sectional view showing the arrangement of the air-collecting pipes. Fig. 5 is a detail of the lower air-inlet pipes and valve.

Referring to the drawings, $a$ designates the car-axle, $b$ the wheels, and $c$ the axle-spindles. Upon each spindle $c$ is secured a cylindrical journal-casting $d$, which is provided with a series of preferably equidistant slots, four being shown, in which slots are arranged the radially-movable pistons or slides $e$. The casting $d$ is inclosed in a cylinder $f$, closely fitted within a journal-box casting $k$, which externally resembles an ordinary journal-box and is confined in the pedestals $v$ of the car-truck, the pedestals being supported by springs $w$ on the journal-boxes in the usual manner, a simple form being conventionally illustrated in the drawings.

The cylinder $f$ is of larger internal diameter and slightly longer than the casting $d$ on spindle $c$, and the ends of cylinder $f$ are closed by heads $g$, which are air-tightly fitted against the ends of the casting $d$, but the inner head $g$ has an opening or slot $h$ for the passage of the axle $a$, said opening permitting a limited vertical movement or play of the spindle and casting $d$ within the journal-box and cylinder $f$. The journal-box $k$ preferably incloses the cylinder $f$ and heads $g$, the inner side plate $i$ of the journal-box $k$ being preferably removable.

The pistons or slides $e$ may be of any suitable construction and moved in and out by any suitable means. As shown, they are provided on their ends with pins $j$, which engage annular grooves $l$ in the heads $g$, these grooves $l$ being concentric to the cylinder $f$ and eccentric to the opening $h$. By means of these pins and grooves $l$ the outer edges of the slides $e$ are always kept in contact with the inner periphery of the cylinder $f$, no matter in what position they may be. In practice the rubbing joints between the slides $e$ and the heads $g$ and walls of cylinder $f$ are made as close or air-tight as possible in any suitable manner.

The weight of the car-body, which is supported upon the journal-boxes $k$ in the usual manner, will normally cause the eccentric displacement of the casting $d$ within the cylinder $f$, and the weight of the car will cause the upper portion of the casting $d$ to contact with the upper part of cylinder $f$, as indicated in the drawings, so that the casting $d$ is normally eccentric to the cylinder $f$. As the car progresses, of course, the journal-casting $d$ rotates within the journal-box $k$, and the pistons $e$, rotating with the casting, serve as air-compressors, and in moving through the annular space within the cylinder $f$ compress the air therein.

The point of contact between the parts $d$ and $f$ is normally at the upper side thereof, and air may be admitted at one side of this line of contact through a pipe $m$ and withdrawn at the other side through a pipe $n$, said pipes both connecting with a pipe $o$, and at the junction of these pipes is a valve $p$, (see Fig. 4,) which is provided with two passages, and when adjusted in one position one passage will register with pipes $n$ and $o$, so that the compressed air will be taken into a suitable reservoir $z$, which may be located upon the body of the car, and at the same time the other passage of valve $p$ will register with pipe $m$ and a short inlet-pipe $q$, so that air can enter through pipes $q$ and $m$ into the journal-compressor. When the movement of the car is reversed, valve $p$ can be turned, so as to register pipes $o$ and $m$ and pipes $n$ and $q$.

Air may be admitted into the lower part of the pumping chamber or cylinder $f$ below the casting $d$ at opposite sides of the center through pipes $r$ and $s$, each connected with a pipe $t$, a valve $u$ being located in the junction of these pipes, which valve can be shifted so as to establish communication between either pipes $r$ and $t$ or $s$ and $t$. When the car is moved in one direction, the pipes $r$ and $t$ should be in communication and pipe $s$ closed. When going in the reverse direction, the pipe $r$ should be closed and the pipes $s$ and $t$ in communication.

The lower air-entrances are provided to admit the air between the pistons at that point. In the position shown in Fig. 3 as the pistons rotate the cubical area of the air-chambers is much increased at the bottom, and unless air is admitted the air therein will be expanded and the compression would not be so great; but by admitting air at the bottom a greater amount of air will be compressed.

Preferably these journal-bearing air-compressors are used in place of the ordinary journal-bearings at each end of the axle and on both axles of the car or car-truck, and consequently a large amount of air can be rapidly compressed and stored in a suitable receptacle $v$ upon the vehicle. As the pressure increases the amount of air compressed will be lessened, because the compressed air will cause a displacement of the parts $d$ and $f$, and if all the sliding joints are perfectly air-tight the air-pressure will eventually cause the part $d$ to assume a position concentric to the cylinder $f$, and in this position no more air will be compressed. This position will be obtained at the maximum pressure and maintained, because the compressed air confined in the chambers between the pistons $e$ would not pass out, the maximum compression having been reached, this maximum compression being the weight of the car superimposed or suspended from the axle-boxes $k$. Consequently in this condition of parts the weight of the car will be cushioned pneumatically in the boxes. When it is not desired to compress air, communication may be established between pipe $o$ and the atmosphere in any suitable manner, in which case practically no compression of air would occur, and the parts would run idly.

In the structure shown the wheels are attached to the axle and the spindle rotated. It is obvious that the result and operation would be substantially the same if the spindles were fixed and the journal-box was attached to the hubs of the wheel. I do not wish to confine myself to the precise construction of parts shown in the drawings.

Having thus described my invention, what I therefore claim as new, and desire to secure by Letters Patent thereon, is—

In a combined journal-bearing and air-compressor for vehicles, the combination of the journal-box, a spindle eccentrically located within the journal-box and of smaller diameter than the latter; with slides or pistons attached to the spindle for compressing the air as the vehicle is moved forward, pipes for collecting the compressed air, and means for admitting air into the lower part of the journal-box, for the purpose and substantially as described.

In testimony that I claim the foregoing as my own I affix my signature in presence of two witnesses.

CHARLES F. DU BOIS.

Witnesses:
ARTHUR E. DOWELL,
JAMES R. MANSFIELD.